Sept. 15, 1970   W. J. DUTTON ET AL   3,528,753
HELICOPTER BLADE WITH NON-HOMOGENEOUS STRUCTURAL SPAR
Filed June 14, 1968   2 Sheets-Sheet 1
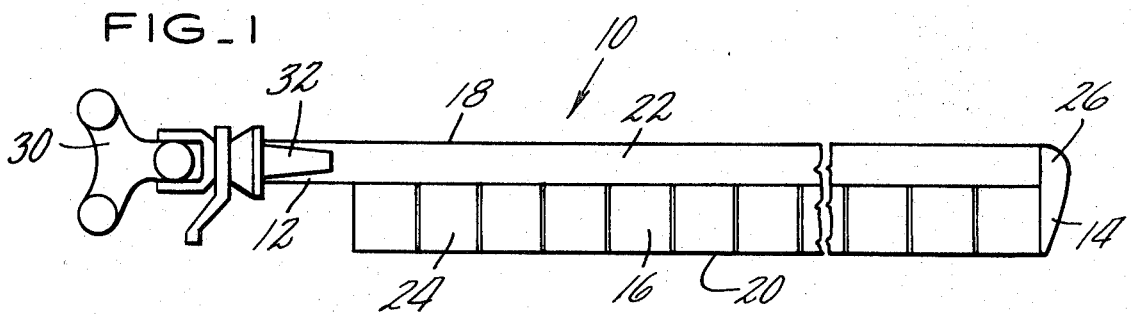
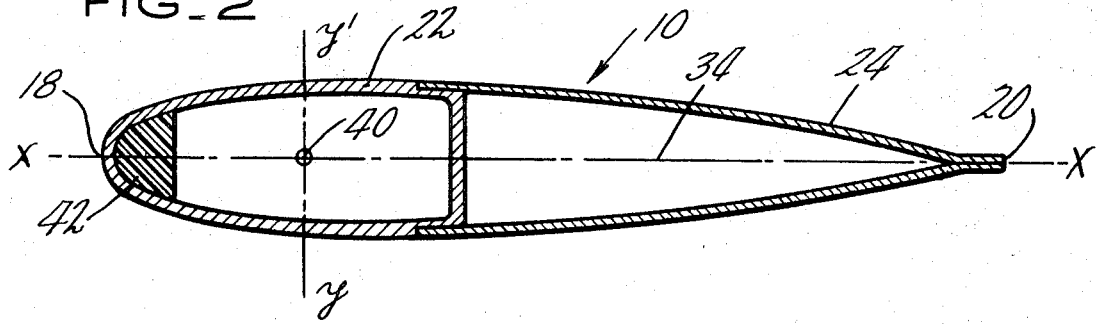
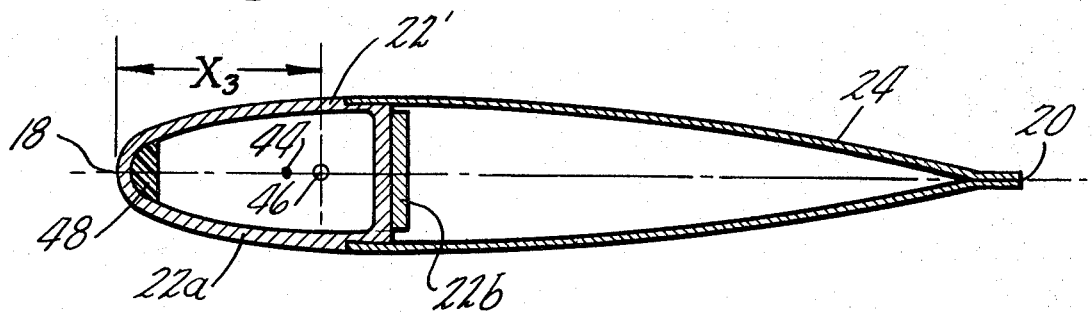
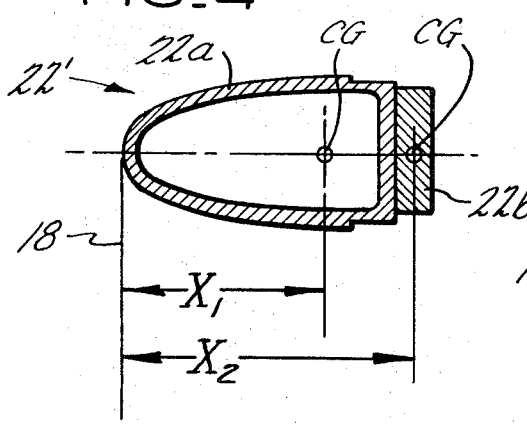
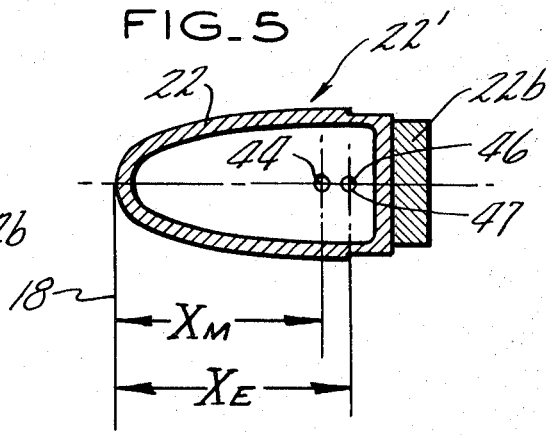
INVENTORS
WALTER J. DUTTON
WALTER GERSTENBERGER
BY Vernon F. Hauschild
ATTORNEY

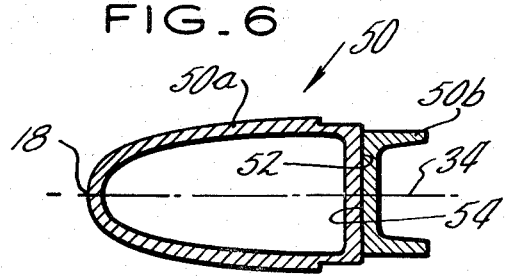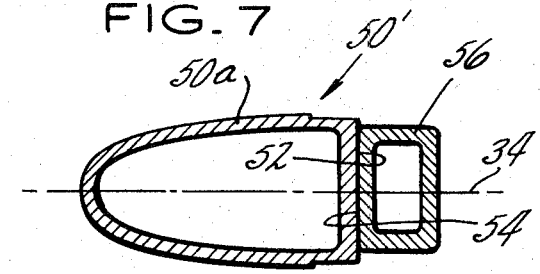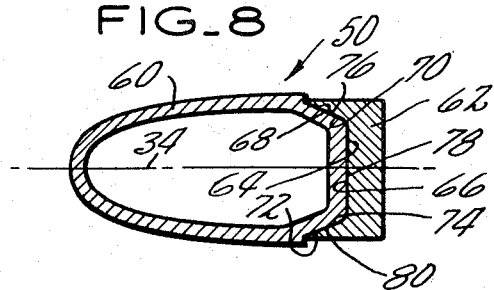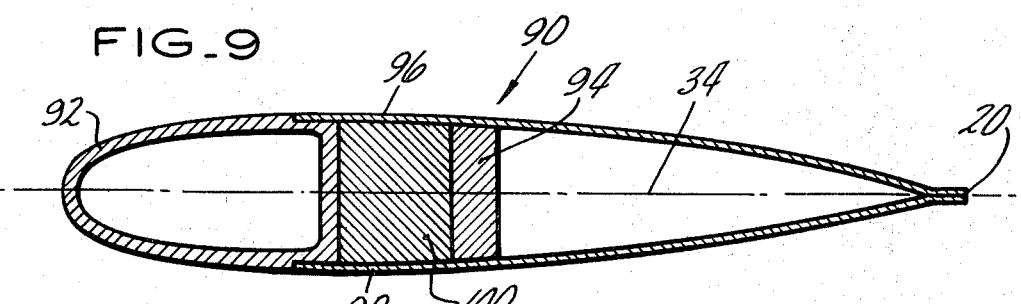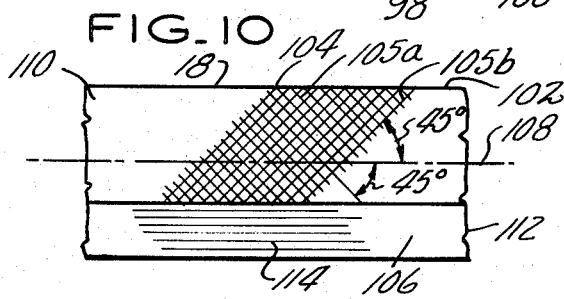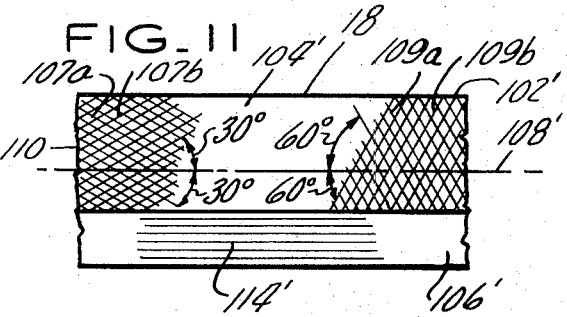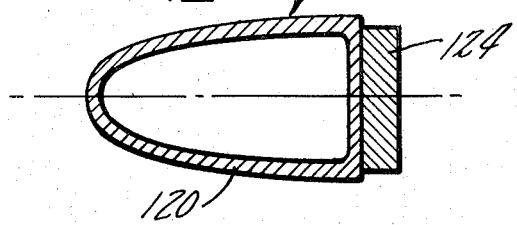

United States Patent Office 3,528,753
Patented Sept. 15, 1970

3,528,753
HELICOPTER BLADE WITH NON-HOMOGENEOUS STRUCTURAL SPAR
Walter J. Dutton, Newtown, and Walter Gerstenberger, Milford, Conn., assignors to United Aircraft Corporation, East Hartford, Conn., a corporation of Delaware
Filed June 14, 1968, Ser. No. 737,127
Int. Cl. B64c 27/46
U.S. Cl. 416—226
24 Claims

ABSTRACT OF THE DISCLOSURE

A helicopter blade, including a non-homogeneous structural spar forming the forward portion thereof and a non-structural fairing assembly forming the trailing edge structure thereof and with the non-homogeneous spar including a forward portion and an after portion of selected shape, position and physical properties so that the spar centroid, center of gravity, flexural axis and torsional axis, and the blade aerodynamic center and center of gravity are each selectively positionable and preferably coincident.

CROSS REFERENCES TO RELATED APPLICATIONS

There are no related patent applications.

BACKGROUND OF THE INVENTION

This invention relates to helicopter blades which are fabricated of a structural spar and a nonstructural after end fairing cooperating therewith to define the aerodynamic cross section of the blade and still more particularly to such a blade in which the structural spar is non-homogeneous.

In the helicopter blade field, the initial approach was to make the helicopter blade so that it was of substantially uniform cross section and of homogeneous construction. This construction was simple, however, the blade proved much too heavy.

In an attempt to lighten the helicopter blade, blades were then fabricated as a monocoque. Such a blade was substantially uniform but all structural members were positioned at the periphery of the blade so that the blade was more or less hollow. While this monocoque construction produced the desired lightness, it had the disadvantage that the trailing edge has to be made very thin and cannot withstand edgewise bending loads.

The experience with the monocoque brought the helicopter industry to the realization that webs runnings perpendicular to the blade chord were needed for strength purposes. Early experience with helicopter blades revealed that such blades were susceptible to flutter problems and it was therefore realized that it would be important to selectively position the aerodynamic center, the mass centroid (center of gravity) and the torsional axis (shear center) of the blade, and preferably to make them coincident. This meant that the weight of the blade would be at the forward end and the blade trailing edge would be fabricated to be light in construction. Experience with such continuous, light trailing edges on blades showed that this type of trailing edge could not withstand the loads imposed upon it and, consequently, the blade trailing edge would crack. To overcome these lightweight trailing edge failures, helicopter blades were designed so that the trailing edge was made of a series of nonstructural pockets which were in contact with one another but at liberty to move with respect to one another.

This development brought about a construction of helicopter blade in which the structural member is a spar forming the forward portion of the blade and this series of nonstructural pockets forms the after end or trailing edge portion of the blade and is connected to the spar and cooperates therewith to define the airfoil shaped cross-section of the blade. To prevent forward bending in a blade of this construction, it was found necessary to add nonstructural counterweights at the spar leading edge to counterbalance the nonstructural trailing edge pockets. Such a helicopter rotor blade is shown in U.S. Pat. No. 2,754,917 and U.S. Pat. No. 2,754,918. While these nonstructural counterweights are essential to counterbalance the nonstructural trailing edge pockets and have the advantage that they do not affect important blade structural parameters such as the flexural axis location, nonetheless their required use brings with it the penalty of added weight. The weight added to the helicopter blade by these nonstructural counterweights and their retention systems is particularly undesirable because it reduces the strength-to-weight ratio of the blade.

SUMMARY OF THE INVENTION

A primary object of the present invention is to reduce the weight of the helicopter blades by providing a structure whose proportions and materials are so chosen that less nonstructural material is needed in the form of leading edge counterweights. A further object of the invention is to provide a means of placing the flexural axis and the mass centroidal axis of the helicopter blade in a single desirable location, so that the blade can be retained along this axis and will then not bend in the edgewise direction due to the influence of centrifugal force.

In accordance with the present invention, the structural spar is made non-homogeneous and includes a forward portion of selected shape, size and physical properties as well as an after member of selected shape, size and physical properties such that the after member has a higher modulus of elasticity than the forward member and such that the ratio of the modulus of elasticity-to-density of the after member is greater than the ratio of the modulus of elasticity-to-density of the forward member.

In accordance with a further aspect of the present invention, the structural spar is made of two independent parts which are joined together by an appropriate bonding material so as to thereby eliminate or retard crack propagation throughout the entire spar assembly.

In accordance with still a further aspect of the present invention, this helicopter blade can be fabricated so that the blade aerodynamic center and center of gravity, and the structural spar centroid, center of gravity, flexural axis, and torsional axis are selectively positionable and preferably coincident.

The invention permits the use of a rear or after structural member which is of any selected shape so as to selectively position the spar torsional axis, so as to permit pressure testing thereof when this spar portion is a channel member, and to permit separation between the forward and after portions of the structural spar when this blade construction is used in a low aspect ratio blade.

In accordance with a further aspect of this invention, the forward low modulus spar portion is designed to be channel-shaped or D-shaped in cross section and to have a coincident centroid and center of gravity. Nonstructural pockets are added to the spar and these nonstrutcural pockets are of selected shape and size so that the aerodynamic center of the blade is coincident with the spar centroid and rearward of the spar center of gravity. The option is available to use some form of nonstructural counterweights to bring the blade center of gravity into coincidence with the spar centroid and the blade aerodynamic center. This will not be necessary in all instances and, even when used, will be much lighter than the nonstructural counterweights of the prior art described supra. The high modulus portion of the spar is positioned aft or

3 rearward of and attached to the forward, low-modulus portion of the spar to bring the spar center of gravity into coincidence with the aerodynamic center and center of gravity of the blade. In such a construction the above-mentioned nonstructural counterweights are certainly not needed. In addition, the shape, cross-sectional area, modulus of elasticity and density of the forward and after structural portions of the spar are selected so that the spar flexural axis and torsional axis is coincident with the blade aerodynamic center and center of gravity.

The invention permits the use of a non-homogeneous spar which is of one piece construction or two piece construction with high modulus fibers running through the structural portions in selected directions so that the modulus-to-density ratio of the after spar or after spar portion is greater than the modulus-to-density ratio of the forward spar or forward spar portion.

BRIEF DESCRIPTION OF THE DRAWINGS

FIG. 1 is a plan view of a modern helicopter blade utilizing a structural spar and nonstructural trailing edge pockets.

FIG. 2 is a cross-sectional showing of the prior art helicopter blade to show the spar, nonstructural pockets and nonstructural counterweights, as well as the blade parameters established thereby.

FIG. 3 corresponds to FIG. 2 but shows such a helicopter blade using the non-homogeneous spar taught herein.

FIG. 4 is a cross-sectional showing of a non-homogeneous structural spar indicating the location of the centers of gravity of the spar portions with respect to the blade leading edge.

FIG. 5 is similar to FIG. 4 and indicates the location of the non-homogeneous spar center of gravity or mass centroid from the blade leading edge ($X_m$) and the location of the spar flexural neutral axis from the blade leading edge ($X_e$).

FIG. 6 is a cross-sectional showing of still another embodiment of a non-homogeneous structural spar in which the high modulus spar portion is of irregular shape and is, in effect, a beam with a pair of relatively thick flanges.

FIG. 7 is a cross-sectional showing of another possible embodiment of the non-homogeneous structural spar in which both spar elements are tubular in shape so as to permit pressurization to detect cracks therein and is formed as a two-celled box beam.

FIG. 8 is a cross-sectional showing of another embodiment of a non-homogeneous structural spar having an irregular interface between the low and high modulus spar portions and which affords substantial bonding area between the spar portions.

FIG. 9 is a cross-sectional showing of still another embodiment of the helicopter blade taught herein where the non-homogeneous structural spar includes two members which are not joined but separated and connected together through some third member.

FIG. 10 is a plan view of a non-homogeneous helicopter spar wherein the parts thereof are made of composite materials including fibers extending therethrough.

FIG. 11 is similar to FIG. 10, except that it illustrates a non-homogeneous spar configuration made of composite material wherein the fibers running therethrough extend at different angles to the blade span axis at different stations on the blade.

FIG. 12 is a cross-sectional showing of a non-homogeneous spar made of materials of substantially equal moduli of elasticity but of different densities.

DESCRIPTION OF THE PREFERRED EMBODIMENTS

Referring to FIG. 1, we see modern helicopter blade 10, which includes root section 12, tip section 14, and airfoil section 16 extending therebetween and cooperating therewith to form the blade span. Blade 10 also includes leading edge 18 and trailing edge 20, which define the blade chord therebetween.

4

Blade 10 comprises structural spar 22, which extends along the span of and defines the blade leading edge 18. A plurality of nonstructural pockets 24 are attached to spar 22 by bonding or other appropriate means and cooperate therewith to form the airfoil section 16 of the blade. Tip cap 26 envelops the tip end of spar 22 and the outermost nonstructural pocket 24.

Blade 10 is connected to the helicopter rotor 30 by blade connecting means 32 and is supported from rotor 30 for rotation to produce lift and thereby motivate the helicopter. Rotor 30 and connecting means 32 form no part of this invention but may be of the type shown in U.S. Pat. Nos. 2,925,130 and 3,097,701.

Referring to FIG. 2 we see the prior art helicopter blade of the type taught in U.S. Pat. Nos. 2,754,917 and 2,754,918 to which reference may be had for a more particular description of the helicopter blades described herein. This prior art blade consists of a homogeneous spar member 22, which is symmetric about the blade chord 34 and which is hollow and substantailly D-shaped in cross section. Spar 22 defines blade leading edge 18 while nonstructural pockets 24 define blade trailing edge 20. These parts are selectively shaped in cross section so that the aerodynamic center of blade 10 is positioned along spanwise extending axis 40. Spar 22 is specifically formed so that its centroid is also along axis 40 and therefore coincident with aerodynamic center with the blade. Nonstructural counterweights 42 are positioned at the forward end of the spar 22 to counterbalance the nonstructural pockets 24 so as to position the center of gravity of the blade at axis 40 also so that it is therefore coincident with the aerodynamic center of the blade and the spar centroid. Noting the X and Y axis associated with FIG. 2, the characteristics of this blade are such that the flexural or neutral axis in a Y direction is exactly on the spar centroid 40 while the shear center of the spar is approximately on the spar centroid.

It will be noted that while the nonstructural counterweights 42 of FIG. 2 are necessary to counterbalance the nonstructural pockets 24 thereof, and have the characteristic that they do not affect the location of such blade parameters as the flexural axis thereof, they nonetheless perform no useful load carrying function and therefore their reduction in size or elimination is desirable.

As previously stated, it is the object of this invention to reduce the overall blade weight and maintain a high strength-to-weight ratio in the blade by utilizing a non-homogeneous spar such as is shown in FIG. 3. The non-homogeneous spar 22' of FIG. 3, which consists of forward low-modulus portion 22a and after high-modulus portion 22b, is substituted for the homogeneous spar 22 of the prior art FIG. 2 construction. We are accordingly herein substituting a structural member, such as after high-modulus structural spar portion 22b, for all or a portion of the nonstructural counterweights 42 of the FIG. 2 embodiment. The addition of such a structural member has an effect, however, upon such important blade parameters as the flexural axis. The non-homogeneous spar 22' has a substantially diminished chord dimension with respect to the homogeneous spar 22 of FIG. 2.

It will be noted that in the non-homogeneous spar 22', the spar center of gravity 44 is positioned ahead of the blade aerodynamic center at 46. Accordingly, when nonstructural pockets 24 are attached to spar 22', the center of gravity of the entire blade may be shifted to be coincident with the aerodynamic center at 46; and, if any forward shifting thereof is necessary, a very small nonstructural counterweight 48 may be used. It should be noted that if any counterweight at all is needed at 48, it will be substantially smaller and lighter than the counterweight 42 of the prior art FIG. 2 construction because of the initial offset relationship between the spar CG and the blade aerodynamic center.

A problem arises, however, when we want to place the flexural axis also coincident with the blade CG and aerodynamic center at point 46. Consideration of this problem can best be explained by considering FIGS. 4 and 5.

Viewing FIGS. 4 and 5, we see a cross-sectional representation of a non-homogeneous spar 22' including the forward low-modulus portion 22a and the aft high-modulus portion 22b. The area, density and modulus of elasticity of low-modulus portion 22a will be designated as $A_1$, $\varphi_1$ and $E_1$, respectively, while comparable parameters of high-modulus portion 22b will be designated as $A_2$, $\varphi_2$ and $E_2$, respectively. The individual cross-sectional area centroids will be at distances $X_1$ and $X_2$, respectively, from leading edge line 18.

We compute mass centroid of the spar, which in a uniform gravitational field is the same as the center of gravity, by the following equation wherein $X_M$ equals the dimension of the centroid from line 18:

$$X_M(A_1\varphi_1 + A_2\varphi_2) = X_1A_1\varphi_1 + X_2A_2\varphi_2 \quad (Eq. 1)$$

We compute the location $X_E$ of the flexural neutral axis from line 18 by the following equation:

$$X_E(A_1E_1 + A_2E_2) = X_1A_1E_1 + X_2A_2E_2 \quad (Eq. 2)$$

Since $$\frac{E_1}{\varphi_1\varphi_2} < E_1$$

by design and selection since 22b is the high modulus material, we must bear this in mind in determining the relative location of the flexural neutral axis and the mass centroid or CG. To see the effect of this relationship, we rewrite Equations 1 and 2 as follows:

$$X_M = \frac{X_1A_1\varphi_1 + X_2A_2\varphi_2}{A_1\varphi_1 + A_2\varphi_2}$$

$$= X_1A_1\left(\frac{\varphi_1}{A_1\varphi_1 + A_2\varphi_2}\right) + X_2A_2\left(\frac{\varphi_2}{A_1\varphi_1 + A_2\varphi_2}\right)$$

(Eq. 3)

and similarly $$X_E = X_1A_1\left(\frac{E_1}{A_1E_1 + A_2E_2}\right) + X_2A_2\left(\frac{E_2}{A_1E_1 + A_2E_2}\right)$$

(Eq. 4)

It should be noted from the above equations that the value of $X_M$ is determined by the relative values of $\varphi_1$ and $\varphi_2$, since in this solution the values $X_1$, $A_1$, $X_2$ and $A_2$, which depend upon geometry only, are temporarily considered fixed. We can therefore see that if $\varphi_1$ is a very large number and $\varphi_2$ is a very small number, $X_M$ will be very close to $X_1$ and if the relative value $\varphi_1$ and $\varphi_2$ were reversed, $X_M$ will be very close to $X_2$. It will be evident that the dimension $X_M$ and hence the position of the mass centroid or CG of the spar 22' can be controlled by proper selection of the densities $\varphi_1$ and $\varphi_2$ of the non-homogeneous spar portions 22a and 22b.

It will be similarly observed by viewing Equation 4 that if $E_2$ is a very large number and $E_1$ is very small, $X_E$ will be very close to $X_2$ and that the dimension $X_E$ and the position of the flexural neutral axis can be determined by control or selection of moduli $E_1$ and $E_2$.

With the above equations and relationships in mind, we can produce the relationship $X_E > X_M$ wherein the neutral axis or flexural axis 47 is aft or rearward of the CG and coincident with the aerodynamic center, and the CG of the blade can thereafter be moved into coincidence therewith by the addition to the spar of the nonstructural pockets 24. For example, (1) a large $E_2$ and a small $\varphi_2$ combined with the large $\varphi_1$ and small $E_1$, or (2) with $E_2 > E_1$ and with $\varphi_1$ and $\varphi_2$ about the same or (3) with $E_1$ and $E_2$ about the same and with $\varphi_1 > \varphi_2$. Any of the preceding combinations will produce this desired $X_E > X_M$ result.

An important advantage of the helicopter blade taught herein utilizing the non-homogeneous spar is that the overall helicopter blade is lightened and for less weight of structural members, we are able to achieve the required structural properties of the blade. In addition, the amount of nonstructural counterweight required is reduced and probably eliminated and this permits a greater ratio of strength-to-weight in the overall blade. In addition, it will be noted by viwing FIGS. 2 and 3 that we have reduced the cord dimension of the structural portion of the blade, namely the spar, and this is important because the structural portions of the blade are vulnerable to fire power of the enemy and this construction provides the enemy with a minimum sized target.

By viewing FIGS. 4 and 5 and considering the formulas given above, it will be evident that to obtain the advantages of this non-homogeneous spar blade construction, it is necessary that the ratio of the density of spar portion 22b to the density of the spar portion 22a namely, $\varphi_2/\varphi_1$, is less than the ratio of the moduli of elasticity of these two parts, namely $E_2/E_1$ so that:

$$\varphi_2/\varphi_1 < E_2/E_1$$

Another important consideration with respect to the construction of the non-homogeneous spar taught herein is that the torsional axis of the spar may also be made coincident with the aerodynamic center of the blade. We can position the torsional axis of the spar and control the torsional stiffness of the spar by properly selecting the shape of the after, high-modulus spar member and its position with respect to the forward low-modulus spar member. The manner of analyzing such a structure is explained in "Analysis and Design of Aircraft Structures" by Bruhn, vol. one, chapter A15, 1958 edition.

It will therefore be seen that in this helicopter blade construction, the following can be accomplished:

(1) The location of the aerodynamic center of the blade can be controlled by properly selecting the airfoil shape of the entire blade.

(2) The flexural axis of the blade spar can be positioned by carefully selecting the structural properties of the spar elements, namely, the shape and relative location of the low and high modulus portions of the non-homogeneous spar and the ratio of the moduli of elasticity to density in accordance with the formula given above.

(3) The neutral or torsional axis of the non-homogeneous spar can be located by properly locating and shaping the high modulus portion of the non-homogeneous spar.

After carrying through on the above steps (1) through (3), we can maintain independent control of the center of gravity of the blade by use of leading edge, non-structural counterweights.

While we have illustrated how these various spar structural characteristics can be individually moved and positioned into coincidence, it is not always desirable that this coincidence occurs, and it is therefore important to note that each of the blade structural characteristics individually and selectively positionable as illustrated and discussed above. This ability to individually position these parameters is very important when we take into account torsional divergence in high advance ratio blades. As used herein high advance ratio means the velocity of the helicopter divided by the rotational tip speed of the blades.

Viewing the FIG. 6 construction, we see an embodiment of the non-homogeneous spar 50, which is intended for use with non-structural pockets (not shown) to complete the blade airfoil and which includes a forward, low-modulus portion 50a and an after, high-modulus portion 50b. It will be noted that portion 50b differs from the high-moduli spar portions shown previously in that those previously illustrated are rectangular in cross-section whereas spar portion 50b is of U-shaped cross section. It will be noted by viewing FIG. 6 that forward, low-modulus spar portion 50a is hollow and of substantially D-shaped cross section, symmetric about chord 34 and with the central portion of the curved portion of the capital letter D located at the blade leading edge 18, thereby having spar portion 50a present a flat surface 52, extending perpendicular to chord 34 and facing in the direction of the blade trailing edge. Spar portion 50b is adhesively bonded to flat surface 52 of spar portion 50a when its corresponding and mating flat surface 54 is juxtapositioned thereto.

It is interesting to note that in the FIG. 6 construction, low-modulus spar portion 50a may be pressurized and this, of course, is of advantage in crack detection.

FIG. 7 differs from FIG. 6 in that the high-modulus portion 56 of the spar 50' is hollow and substantially rectangular in cross section. An advantage of the FIG. 7 construction is that both spar portions 50a and 56 are hollow and therefore can be pressurized as taught in U.S. Pat. No. 3,168,144 to permit crack detection. The FIG. 7 construction provides the advantage of providing substantial flat surfaces 52 and 54 between the spar portions 50a and 56. These flat surfaces 52 and 54 are bonded together with the material whose properties will be described in greater particularity hereinafter.

While each of the embodiments described previously include a single, flat interface between the low modulus and the high modulus portions of the blade spar, other types of interfaces may be appropriate under certain conditions. For example, if we want more bonding area between the two elements of the non-homogeneous structural spar, we could well fabricate the interface as shown in FIG. 8. In the FIG. 8 construction, the non-homogeneous spar 50 includes low modulus portion 60 and high modulus portion 62 such that the interface therebetween is partially flat between surfaces 64 and 66, respectively, but there are two other interfaces which are more nearly parallel to blade chord 34 as shown between surfaces 68 and 70 and between surfaces 72 and 74. Other than for the irregular interfaces therebetween, spar portions 60 and 62 are otherwise similar to the previously recited spar portions of the non-homogeneous spar previously described, for instance, each is symmetrical about chord 34. The FIG. 8 configuration would be particularly beneficial in a non-homogeneous spar environment using a material which is very stiff in flexure but not very strong in shear. The FIG. 8 construction would be particularly beneficial under these circumstances because the transverse shear due to differential bending is largely carried across the bond line between the low modulus spar member 60 and the high modulus spar member 62. In the FIG. 8 embodiment, since the bond line is particularly long and includes sections 76, 78 and 80, such a configuration is particularly well adapted to handle such type of loading.

The FIG. 9 construction would be particularly beneficial in a helicopter using a low aspect ratio helicopter blade, that is, a blade in which the ratio of the radius of the helicopter rotor to the blade chord dimension is low. In the FIG. 9 configuration, non-homogeneous spar 90 includes low modulus member 92, which is similar to corresponding low modulus spar member 50a shown in FIGS. 6 and 7 and high modulus spar member 94 which is spaced from member 92 and positioned between member 92 and the blade trailing edge 20. As in all other non-homogeneous spar configurations illustrated and described previously, members 92 and 94 extend along the blade span between the blade root section 12 and the blade tip section 14. Spar members 92 and 94 may be joined either by skin members 96 and 98 which may be bonded to each or by a third member 100, which may be made of foam, honeycomb, or a sheet metal truss, and which may be attached to each by bonding or the like, or by both such connecting means.

This type of helicopter blade construction is also of advantage from a crack abatement standpoint. Due to the heavy loading and vibrations to which a helicopter blade is submitted, cracks in the structural members thereof are of definite concern and any blade configuration which serves to abate crack propagation is of advantage. Crack propagation retardation would take place in our non-homogeneous structural spar for at least three reasons:

(1) The spar is made from more than one part and any crack which commenced in one part must pass through the interface between the parts and be reinitiated in the second part. This is to be distinguished from a true crack propagation in which a particular crack is increasing in length along a single part.

(2) Our spar configuration permits us to use a geometry at the interface between the two spar parts which will not be conductive to crack propagation therebetween. For example, flat surfaces of substantial dimension would provide a desirable interface because a crack would be less likely to propagate across such an interface than it would be to propagate along a single thin surface of one of the members alone.

(3) By proper selection of the adhesive or other interstitial material, the energy of the crack which attempts to pass through the interstitial material between the two strucural parts would be absorbed in some way by the interstitial material. This crack energy absorption could take place by shearing of the interstitial material or by deforming the interstitial material so that it forms an artificial plastic enclave between the two structural parts of the spar.

A good bonding or interstitial material would be an organic adhesive such as 3M's AF30 or AF41, or American Cyanamid's FM1000. The desirable qualities of this material are that it has high elongation to fracture and low modulus of elasticity compared to ordinary structural materials such as metals or fibrous composites.

We will now consider the materials which will be used for the low modulus spar portion and the high modulus spar portion of our non-homogeneous spar. If aluminum were used for our low modulus material, there would be little advantage to using titanium, steel, magnesium or cobalt or nickel base alloys for the high modulus spar portion because the ratio of modulus-to-density of these materials is substantially the same as for aluminum. The material which we must select for the high modulus material is one which has a ratio of modulus-to-density which is greater than that ratio for the low modulus material. Accordingly, if aluminum were to be used as the low modulus material, the high modulus material could be beryllium or probably, more logically a high strength fibrous composite material using a high modulus fiber such as boron, carbon or silicon carbide with a matrix of organic resin, such as various epoxy compounds, for example, DEN438 by Dow Chemical or a metallic matrix such as aluminum. The overall objective is to get the desired modulus-to-density ratio discussed above.

As a further example, if the low modulus material were fiberglass, the high modulus material could be a metal reinforcement such as titanium, beryllium or the high strength fiber composite materials just discussed.

It is also possible to fabricate both the low modulus and high modulus spar portions of the same fibrous composite material but to control the modulus-to-density ratio by controlling the direction of the fiber within the matrix material. For example, as best shown in FIG. 10, a helicopter non-homogeneous spar 102 includes low modulus portion 104 and high modulus portion 106, which may be of the cross-sectional shape shown in FIGS. 4–9 and which extend along blade axis 108. The fibers 105a and 105b of spar portion 104 do not run parallel to axis 108 but are at substantial angles thereto, possibly plus and minus 45° as shown. Following the parameter placing teachings given above, it may be found desirable that some fibers in spar portion 104 extend parallel to axis 108 while the remainder extend at an angle thereto, such as plus and minus 30° or plus and minus 45°.

In addition, the fiber orientation may be caused to vary between the blade root and the blade tip, for example plus and minus 30° for fibers 107a and 107b at the blade end 110 and plus and minus 60° for fibers 109a and 109b at the blade outboard end 112 since in this portion of the spar, the torsional loading is large in comparison with the centrifugal loading. Spar high-modulus portion 106 has predominantly axially extending fibers 114 (FIGS. 10 and 11) which extend substantially parallel to axis 108 but may be at some small angle thereto, such as plus and minus 5° or plus and minus 15°.

Using such fiber orientation the axial stiffness of spar portion 106 can be made sufficient to position the flexural axis 47 (FIG. 5) aft of the spar center of gravity 44 so that the addition of nonstructural pockets such as 24 of FIG. 3 will bring CG 44 and axis 47 into coincidence.

The axes and parameters of interest can also be selectively positioned by the use of composite material whose moduli are roughly the same and whose densities differ. For example, as best shown in FIG. 12, low modulus portion 120 of the non-homogeneous spar 122 is made of boron fiber composition, whose density is approximately 0.09 lb. per cubic inch, while the high modulus portion 124 is made of carbon fiber composition whose density is approximately 0.05 to 0.06 lb. per cubic inch.

It will be evident to those having skill in the art that the fiber orientation teaching in the FIGS. 10 and 11 construction and the substantially equal moduli-different density teaching of the FIG. 12 construction may be used together to produce the desired result.

In addition, while this invention has been illustrated on symmetrically shaped blades only, the principle is valid for cambered airfoil as well.

What is claimed is:
1. A helicopter blade having:
 (a) a root section,
 (b) a top section,
 (c) an airfoil section including a leading edge and a trailing edge and extending between said blade tip section and said blade root section to define the blade span, while said blade leading edge and said blade trailing edge define the blade chord,
 (d) a first structural member extending spanwise along said blade leading edge and fabricated of a material having a selected density $\varphi_1$ and selected modulus of elasticity $E_1$,
 (e) a second structural member extending spanwise along said blade adjacent and attached to said first structural member and positioned between said first structural member and said blade trailing edge and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of said structural members so joined is positioned a greater distance from said leading edge along said blade chord than the center of gravity of said structural members so joined,
 (f) and at least one non-structural member attached to one of said srtuctural members and cooperating therewith to define said blade airfoil section and being of selected size and weight to move the blade center of gravity axis into coincidence with said flexural neutral axis.

2. Apparatus according to claim 1 wherein said first structural member, said second structural member and said non-structural member, and hence the helicopter blade, are symmetric about the blade chord and wherein said coincident blade center of gravity and blade flexural neutral axis is positioned on said chord.

3. Apparatus according to claim 2 wherein said first structural member is hollow and of D-shaped cross section and positioned symmetrically about said blade chord and so that the curved portion of the D forms the blade leading edge and so that the straight portion of the D presents a flat surface perpendicular to said blade chord and constitutes the nearest portion of said first structural member to said blade trailing edge, and further wherein said second structural member is of rectangular cross section with one of its longer sides presenting a flat surface abutting and attached to said flat surface of said D of said first structural member.

4. Apparatus according to claim 2 wherein said first structural member is hollow and of D-shaped cross section and positioned symmetrically about said blade chord and so that the curved portion of the D forms the blade leading edge and so that the straight portion of the D presents a flat surface perpendicular to said blade chord and constitutes the nearest portion of said first structural member to said blade trailing edge, and wherein said second structural member is of U-shaped cross section with the legs of the U spaced substantially equally from and extending substantially parallel to the blade chord and the base of said U presenting a flat surface extending substantially perpendicular to the blade chord and presenting a flat surface juxtapositioned and bonded to said straight surface of said first structural member.

5. Apparatus according to claim 2 wherein said first structural member is hollow and of D-shaped cross section and positioned symmetrically about said blade chord and so that the curved portion of the D forms the blade leading edge and so that the straight portion of the D presents a flat surface perpendicular to said blade chord and constituting the nearest portion of said first structural member to said blade trailing edge, and wherein said second structural member is hollow and of substantially rectangular cross section and wherein said second structural member presents a flat surface extending perpendicular to the blade chord and which is bonded to said flat surface of said first structural member.

6. In a helicopter blade having a leading edge and a trailing edge defining the blade chord therebetween, a chord dimension, and a span dimension and including:
 (a) a root section,
 (b) a tip section,
 (c) an airfoil section extending between said root section and said tip section to define said blade span,
 (d) a non-homogeneous structural spar extending along the span of said blade and including:
  (1) a low modulus structural member extending along the blade leading edge and fabricated of a material having a selected density $\varphi_1$ and selected modulus of elasticity $E_1$,
  (2) a high modulus structural member positioned between said low modulus member and said blade trailing edge and attached to said low modulus member and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of said structural members so joined is positioned a greater distance from said leading edge along said blade chord than the center of gravity of said structural members so joined,
 (e) and non-structural fairing means attached to said structural spar and shaped to cooperate therewith to define said blade airfoil section and being of selected size and weight to move the blade center of gravity axis into coincidence with said flexural neutral axis.

7. Apparatus according to claim 6 wherein said low modulus member of said spar is substantially D-shaped in cross section and with the curved portion of said D-shape extending along said blade leading edge and further so that said low modulus spar portion presents a flat surface substantially perpendicular to said blade chord, and wherein said high modulus member of said spar includes a flat surface juxtapositioned to and bonded to said flat surface of said low modulus portion of said spar.

8. Apparatus according to claim 6 wherein said high modulus portion of said spar is of substantially rectangular cross section.

9. A low aspect ratio helicopter blade having a leading edge, a trailing edge, a chord dimension extending between said leading edge and said trailing edge and including:
(a) a root section adapted to be connected to a helicopter rotor,
(b) a tip section,
(c) an airfoil section extending between said root section and said tip section so as to define the blade span therewith, and including:
  (1) a first structural spar member extending along said span and defining the leading edge of said blade and fabricated of a material having a selected density $\varphi_1$ and selected modulus of elasticity $E_1$,
  (2) a second structural spar member extending along said blade span and spaced from said first structural member towards said blade trailing edge and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of said structural spar members so joined is positioned a greater distance from said leading edge along said blade chord than the center of gravity of said structural members so joined,
  (3) means joining said first and second structural members to form a non-homogeneous structural spar and,
  (4) non-structural means extending along said span and defining said blade trailing edge and shaped so that when connected to said spar to define the airfoil shape of said blade airfoil-shaped section and being of selected size and weight to move the blade center of gravity axis into coincidence with said flexural neutral axis.

10. Apparatus according to claim 9 wherein said non-structural member is a plurality of nonstructural pockets extending along said blade span and being bonded to said structural spar.

11. A structural spar adapted to be used with a helicopter blade having a span, a leading edge, and a trailing edge and including:
(1) a first structural member extending along the blade span and fabricated of a material having a selected density $\varphi_1$ and selected modulus of elasticity $E_1$,
(2) a second structural member extending along the blade span and located on the trailing edge side of said first member and attached thereto and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of said structural members so joined and the center of gravity axis of said structural members so joined, are positioned at selected distances from said leading edge along said blade chord.

12. A helicopter blade having:
(a) a root section,
(b) a tip section,
(c) an airfoil section including a leading edge and a trailing edge and extending between said blade tip section and said blade root section to define the blade span, while said blade leading edge and said blade trailing edge define the blade chord, and having an axis extending along the blade spar,
(d) a first structural member extending spanwise along said blade leading edge, and being fabricated of a composite material with fibers extending therealong at a substantial angle to said axis and fabricated of a material having a selected density $\varphi_1$ and selected modulus of elasticity $E_1$,
(e) a second structural member extending spanwise along said blade adjacent and attached to said first structural member and positioned between said first structural member and said blade trailing edge, and being fabricated of a composite material with fibers extending therealong substantially parallel to said axis and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of said structural members so joined is positioned a greater distance from said leading edge along said blade chord than the center of gravity of said structural members so joined,
(f) a non-structural member attached to one of said structural members and cooperating therewith to define said blade airfoil section and being of selected size and weight to move the blade center of gravity axis into coincidence with said flexural neutral axis.

13. Apparatus according to claim 12 wherein the angle which the fibers of said first member form with the blade axis vary between the blade root and tip.

14. A structural spar adapated to be used with a helicopter blade having a span with an axis therealong, a leading edge, and a trailing edge and including:
(1) a first structural member extending along the blade span, and being fabricated of a composite material with fibers extending therealong at a substantial angle to said axis and fabricated of a material having a selected density $\varphi_1$ and selected modulus of elasticity $E_1$,
(2) a second structural member extending along the blade span and located on the trailing edge side of said first member and attached thereto, and being fabricated of a composite material with fibers extending therealong substantially parallel to said axis and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of said structural members so joined is positioned a greater distance from said leading edge along said blade chord than the center of gravity of said structural members so joined, 15. Apparatus according to claim 14 wherein the fibers of said second member have a higher modulus of elasticity than the fibers of said first member.

16. Apparatus according to claim 14 wherein the angle which the fibers of said first member form with the axis vary between the ends of the spar.

17. A helicopter blade having a root section and a tip section with the blade span running therebetween, and a leading edge and a trailing edge with the blade chord running therebetween and including:

(1) a non-homogeneous structural spar extending along the blade span and having a leading edge forming the blade leading edge and including:
  (a) a forward portion of cross-sectional area $A_1$, of density $\varphi_1$, and of modulus of elasticity $E_1$,
  (b) a rearward portion attached to said forward portion and positioned between said forward portion and the blade trailing edge and having a cross-sectional area $A_2$, a density of $\varphi_2$, and a modulus of elasticity $E_2$, wherein the spar center of gravity is positioned a selected distance $X_m$ from the spar leading edge according to the formula:

$$X_m = X_1 A_1 \left(\frac{\varphi_1}{A_1\varphi_1 + A_2\varphi_2}\right) + X_2 A_2 \left(\frac{\varphi_2}{A_1\varphi_1 + A_2\varphi_2}\right)$$

wherein $X_1$ is the distance from the spar leading edge of the center of gravity to the forward spar portion, and $X_2$ is the distance from the leading edge to the center of gravity of the rearward spar portion, and wherein the spar flexural neutral axis is positioned a selected distance $X_E$, which is greater than $X_m$, from the spar leading edge according to the formula:

$$X_E = X_1 A_1 \left(\frac{E_1}{A_1 E_1 + A_2 E_2}\right) + X_2 A_2 \left(\frac{E_2}{A_1 E_1 + A_2 E_2}\right)$$

(2) and non-structural pockets connected to said non-homogeneous spar and being of selected shape to cooperate therewith in completing the airfoil shape of said blade and being af selected size and weight to move tthe blade center of gravity into coincidence with the spar flexural neutral axis.

18. Apparatus according to claim 17 wherein said spar forward portion, said spar rearward portion and said non-structural pockets, and hence the helicopter blade, are symmetric about the blade chord and wherein said coincident blade center of gravity and said blade flexural neutral axis is positioned on said chord.

19. Apparatus according to claim 17 wherein said spar rearward and said spar forward portions are adhesively connected to reduce or prevent crack propagation therebetween.

20. A helicopter blade having a root section and a tip section with the blade span running therebetween, and a leading edge and a trailing edge with the blade chord running therebetween and including:

(1) a non-homogeneous structural spar extending along the blade span and having a leading edge forming the blade leading edge and including:
  (a) a forward portion of cross-sectional area $A_1$, of density $\varphi_1$, and of modulus of elasticity $E_1$,
  (b) a rearward portion attached to said forward portion and positioned between said forward portion and the blade trailing edge and having a cross-sectional area $A_2$, a density $\varphi_2$, and a modulus of elasticity $E_2$, wherein the spar center of gravity is positioned a selected distance $X_m$ from the spar leading edge according to the formula:

$$X_m = X_1 A_1 \left(\frac{\varphi_1}{A_1\varphi_1 + A_2\varphi_2}\right) + X_2 A_2 \left(\frac{\varphi_2}{A_1\varphi_1 + A_2\varphi_2}\right)$$

wherein $X_1$ is the distance from the spar leading edge of the center of gravity to the forward spar portion, and $X_2$ is the distance from the leading edge to the center of gravity of the rearward spar portion, and wherein the spar flexural neutral axis is positioned a selected distance $X_E$, which is greater than $X_m$, from the spar leading edge according to the formula:

$$X_E = X_1 A_1 \left(\frac{E_1}{A_1 E_1 + A_2 E_2}\right) + X_2 A_2 \left(\frac{E_2}{A_1 E_1 + A_2 E_2}\right)$$

(2) non-structural pockets connected to said non-homogeneous spar and being of selected shape to cooperate therewith in completing the airfoil shape of said blade and being af selected size and weight to move the blade center of gravity to a position farther from the blade leading edge than the spar flexural neutral axis, (3) and non-structural counterweights attached to said non-homogeneous spar and of selected weight and in selected position to bring said spar flexural neutral axis and said blade center of gravity axis into coincidence.

21. A helicopter blade having:
(a) a root section,
(b) a tip section,
(c) an airfoil section including a leading edge and a trailing edge and extending between said blade tip section aid said blade root section to define the blade span, while said blade leading edge and said blade trailing edge define the blade chord,
(d) a first structural member extending spanwise along said blade leading edge and fabricated of a material having a selected density $\varphi_1$ and selected modulus of elasticity $E_1$,
(e) a second structural member extending spanwise along said blade adjacent and attached to said first structural member and positioned between said first structural member and said blade trailing edge, and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis and the center of gravity axis of said structural members so joined are selectively positioned on said blade chord,
(f) and at least one non-structural member attached to one of said structural members and cooperating therewith to define said blade airfoil section and being of selected size and weight to move the blade center of gravity axis along said blade chord with respect to said flexural neutral axis.

22. Apparatus according to claim 1 wherein said first and second structural members cooperate to form a non-homogeneous blade spar and wherein the portion of said spar adjacent said blade leading edge is the low modulus portion thereof and the portion of said spar nearest said blade trailing edge is the high modulus portion thereof and wherein said low modulus spar portion is shaped to define the spar centroid and center of gravity on the blade chord, further wherein said non-structural member is shaped so that the aerodynamic center of the blade is coincident with the non-homogeneous spar centroid and rearward of the non-homogeneous spar center of gravity on the blade chord, and still further wherein the material of the high modulus spar portion is selected to bring the non-homogeneous spar center of gravity into coincidence with the aerodynamic center and center of gravity of the blade, further wherein the material of said low modulus portion and high modulus portion of said non-homogeneous spar is such that the cross-sectional area, the modulus of elasticity and the density of each are of selected quantities so that the flexural axis of said non-homogeneous spar is coincident with said aerodynamic center and said center of gravity of said blade on the blade chord, and further wherein the shape of said high modulus portion of said non-homogeneous spar is selected so that the torsional axis of the non-homogeneous spar is also coincident with said aerodynamic center and said center of gravity of said blade on the blade chord.

23. A structural spar adapted to be used with a helicopter blade having a span, a leading edge, and a trailing edge and including:
   (1) a first structural member extending along the blade span and fabricated of a material having a selected density $\varphi_1$ and selected modulus of elasticity $E_1$,
   (2) a second structural member extending along the blade span and located on the trailing edge side of said first member and attached thereto and fabricated of a material having a selected density $\varphi_2$ and a selected modulus of elasticity $E_2$ to define the inequality:

$$\frac{\varphi_2}{\varphi_1} < \frac{E_2}{E_1}$$

so that the flexural neutral axis of the structural members so joined is shifted from the flexural neutral axis of the first structural member.

24. The method of producing a helicopter rotor blade composed of a structural spar and non-structural parts and having a structural part neutral axis coincident with the blade mass centroid or center of gravity axis so as to abate in-plane blade bending including the steps of:
   (1) selecting a spar forward portion of selected density $\varphi_1$ and selected modulus of elasticity $E_1$,
   (2) selecting a spar rearward portion of selected density $\varphi_2$ and selected modulus of elasticity $E_2$ bearing a relationship to the density and modulus of elasticity of the spar forward portion to establish the following inequality:

$$\frac{\varphi_2}{\varphi_1} < \frac{E_2}{E_1}$$

(3) attaching the spar after portion to the spar forward portion to thereby produce a non-homogeneous spar and, in view of said inequality, to position the non-homogeneous spar mass centroid or center of gravity axis forward of the non-homogeneous spar flexural neutral axis along the blade chord,
   (4) then attaching at least one non-structural member to said non-homogeneous spar of selected shape and weight to cooperate therewith in defining the blade airfoil section and to cause the blade center of gravity or mass centroid axis to be coincident with the non-homogeneous spar flexural neutral axis, thereby abating in-plane bending of the blade.

References Cited
UNITED STATES PATENTS

| | | |
|---|---|---|
| 2,467,031 | 4/1949 | Hess et al. |
| 2,482,936 | 9/1949 | Renoux. |
| 2,588,570 | 3/1952 | Pitcairn. |
| 2,609,883 | 9/1952 | Daland. |
| 3,105,557 | 10/1963 | Wigal. |
| 3,237,697 | 3/1966 | Ford et al. |
| 3,310,117 | 3/1967 | Slivinsky et al. |
| 3,321,019 | 5/1967 | Dmitroff et al. |
| 3,333,642 | 8/1967 | Kee. |
| 3,372,757 | 3/1968 | Krohncke. |

EVERETTE A. POWELL, JR., Primary Examiner

U.S. Cl. X.R.
416—230